United States Patent [19]
Malone

[11] Patent Number: 5,752,783
[45] Date of Patent: May 19, 1998

[54] PAVER WITH RADAR SCREED CONTROL

[75] Inventor: Kerry Malone, Charleston, Ill.

[73] Assignee: Blaw-Knox Construction Equipment Corporation, Mattoon, Ill.

[21] Appl. No.: 603,831

[22] Filed: Feb. 20, 1996

[51] Int. Cl.⁶ ............................................. E01C 19/22
[52] U.S. Cl. .......................... 404/84.2; 404/84.5; 404/104
[58] Field of Search .................... 404/75, 79, 84.1, 404/84.2, 90, 95, 96, 101, 104, 118, 84.5, 94; 367/909

[56] References Cited

U.S. PATENT DOCUMENTS

| | | |
|---|---|---|
| 3,259,034 | 7/1966 | Davin . |
| 3,604,512 | 9/1971 | Carter et al. . |
| 3,638,540 | 2/1972 | Williams . |
| 3,846,035 | 11/1974 | Davin . |
| 4,379,653 | 4/1983 | Brown . |
| 4,761,037 | 8/1988 | Medeot . |
| 4,818,139 | 4/1989 | Brock et al. . |
| 5,015,120 | 5/1991 | Brock et al. . |
| 5,035,534 | 7/1991 | Brock et al. . |
| 5,044,819 | 9/1991 | Kilheffer et al. . |
| 5,044,820 | 9/1991 | Prang . |
| 5,052,854 | 10/1991 | Correa et al. ........................ 404/94 |
| 5,164,641 | 11/1992 | Quibel et al. . |
| 5,177,415 | 1/1993 | Quibel et al. . |
| 5,248,216 | 9/1993 | Vural .................................. 404/75 |
| 5,288,166 | 2/1994 | Allen et al. . |
| 5,288,167 | 2/1994 | Gaffard et al. . |
| 5,328,295 | 7/1994 | Allen . |
| 5,333,966 | 8/1994 | St-Louis et al. . |
| 5,333,969 | 8/1994 | Blaha et al. . |
| 5,345,471 | 9/1994 | McEwan . |
| 5,356,238 | 10/1994 | Musil et al. ......................... 404/84.1 |
| 5,361,070 | 11/1994 | McEwan . |
| 5,362,176 | 11/1994 | Sovik ................................... 404/72 |
| 5,362,177 | 11/1994 | Bowhall et al. ...................... 404/84.1 |
| 5,373,482 | 12/1994 | Gauthier .............................. 367/99 |
| 5,393,167 | 2/1995 | Fujita et al. ......................... 404/84.1 |
| 5,457,394 | 10/1995 | McEwan .............................. 324/642 |
| 5,484,227 | 1/1996 | Ikeda et al. .......................... 404/84.1 |
| 5,549,412 | 8/1996 | Malone ............................... 404/84.1 |

FOREIGN PATENT DOCUMENTS

0620309 A1  10/1994  European Pat. Off. ............. 404/84.1

*Primary Examiner*—James Lisehora
*Attorney, Agent, or Firm*—Pearne, Gordon McCoy and Granger

[57] ABSTRACT

A paving apparatus is provided with a micropower impulse radar device connected to control a leveller. The leveller is a screed provided with actuators for adjusting screed elevation, slope, and extension. The radar senses a reference, such as a string line, and operates the actuators to adjust the screed.

26 Claims, 4 Drawing Sheets

PAVER WITH RADAR SCREED CONTROL

BACKGROUND OF THE INVENTION

1. Field of the Invention

This invention relates generally to the field of road construction and specifically to a screed control using a micropower impulse radar.

2. Description of the Related Art

Pavers use a towed screed to level paving material applied on a base surface. The screed height is adjusted to control the level of the paving material. The screed elevation is controlled by hydraulic actuators that raise or lower forward tow points of the screed. A reference level is provided so that the material will form a smooth surface, regardless of bumps and depressions that the paver encounters in the base surface.

Several different types of references are known in the art including a string line constructed for the purpose, an average level of the base surface determined by a moving beam, the base surface itself, a laser target, and several other references that are preexisting or erected for the paving operation. A sensor determines the position of the screed relative to the reference. Sensors include laser devices, ultrasonic devices, and mechanical devices. Examples of grade control and other road working control apparatus are shown in U.S. Pat. Nos. 3,638,540 to Williams; 3,604,512 to Carter; 3,846,035 to Davin; 3,259,034 to Davin; 5,044,820 to Prang; 5,333,966 to St-Louis; 5,356,238 to Musil; 5,328,295 to Allen; 5,288,166 to Allen; and 5,288,167 to Gaffard, all incorporated herein by reference.

The grade sensor indicates deviation of the screed from the reference. The sensor sends a signal to a controller that adjusts the screed. Generally, such adjustments occur continuously during paving. Slope, that is the lateral angle of the screed, can also be controlled using grade sensors on opposite sides of the paver.

For paving surfaces that are wider than the paver, an extendable screed is provided, as shown in U.S. Pat. No. 4,379,653 to Brown. Paving material can be delivered to the paver by a material transfer machine, as shown in U.S. Pat. Nos. 4,818,139, 5,015,120, and 5,035,534 to Brock, these references being incorporated herein by reference.

U.S. Pat. Nos. 5,345,471 and 5,361,070 to McEwan, incorporated herein by reference, describe devices related to ultra-wideband radar, known as micropower impulse radar ("MIR"). Sensors using MIR technology can determine, among other things, distance to an object within a relatively small range and with less power than conventional radar. U.S. Pat. Nos. 5,164,641 and 5,177,415 to Quibel show road working apparatus adapted for using a radar sensor.

SUMMARY OF THE INVENTION

The present invention provides a road working apparatus including a movable vehicle and a leveller disposed on the vehicle for forming a mat of material on a base surface. A radar device is provided for determining the position of the leveller relative to a reference. A leveller controller adjusts the leveller responsive to leveller position information from the radar device.

The radar device is a micropower impulse radar used as a rangefinder. The reference is a string line or a base surface being worked. The vehicle is a paver adapted for levelling paving material, and the leveller is a floating screed. The leveller is laterally extendable and the leveller controller is adapted for controlling extension of the screed. An extension actuator is adapted for laterally extending the screed, and the controller is connected to operate the actuator. The controller is adapted for adjusting screed elevation responsive to the leveller position information from the radar device.

An actuator is adapted for adjusting screed elevation, and the leveller controller is connected to operate the actuator. A tow arm is connected to tow the screed and adapted for being operated by the actuator for adjusting the screed. The radar device is disposed on the screed. The controller, radar device, tow arm, and actuator are adapted for adjusting elevation of an end of the screed and a second radar device, a second tow arm, and a second actuator, are adapted for controlling elevation of another end of the screed with respect to a second reference so as to provide slope control. The leveller is laterally extendable and the controller is adapted for controlling extension of the leveller.

In one preferred construction the invention is a paver having a hopper for receiving and holding paving material. A screed is provided for levelling paving material from the hopper on a base surface. A conveyor is provided for moving the paving material from the hopper to the screed. An auger is provided for distributing paving material from the conveyor laterally ahead of the screed. A pair of tow arms extend forwardly from the screed, and an actuator is connected to adjust one of the tow arms thereby adjusting the screed. A grade sensor is mounted for movement with the screed and includes a radar device adapted for measuring a distance to a reference. A screed control is connected to control the actuator responsive to distance signals from the grade sensor so as to adjust screed elevation. The screed includes an end gate disposed at an end thereof for containing paving material and the grade sensor is mounted on the end gate. The radar device is adapted for sensing the distance to a temporarily constructed reference.

A second radar device is disposed on an end of the screed and adapted for sensing deviation from a second reference. The leveller is laterally extendable and the controller is adapted for controlling extension of the leveller responsive to sensed deviation from the second reference. The second radar device is disposed on an end of the screed and adapted for sensing distance to an obstruction. The leveller is laterally extendable and the controller is adapted for controlling extension of the leveller responsive to a sensed distance from the obstruction.

DESCRIPTION OF THE PREFERRED EMBODIMENTS

Figure 1:
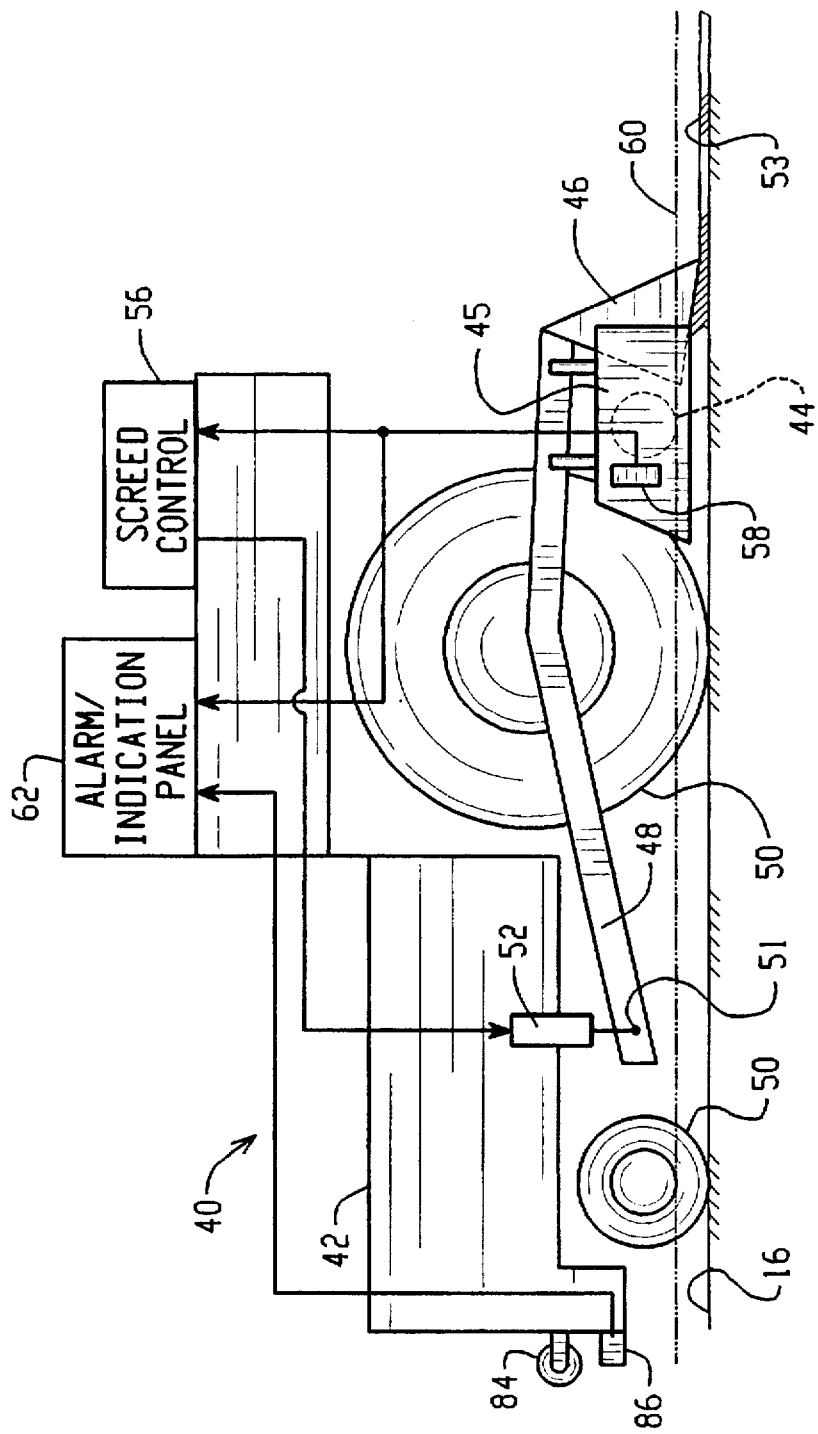
FIG. 1 shows a schematic, side elevation view of a paver according to the invention.
Figure 2:
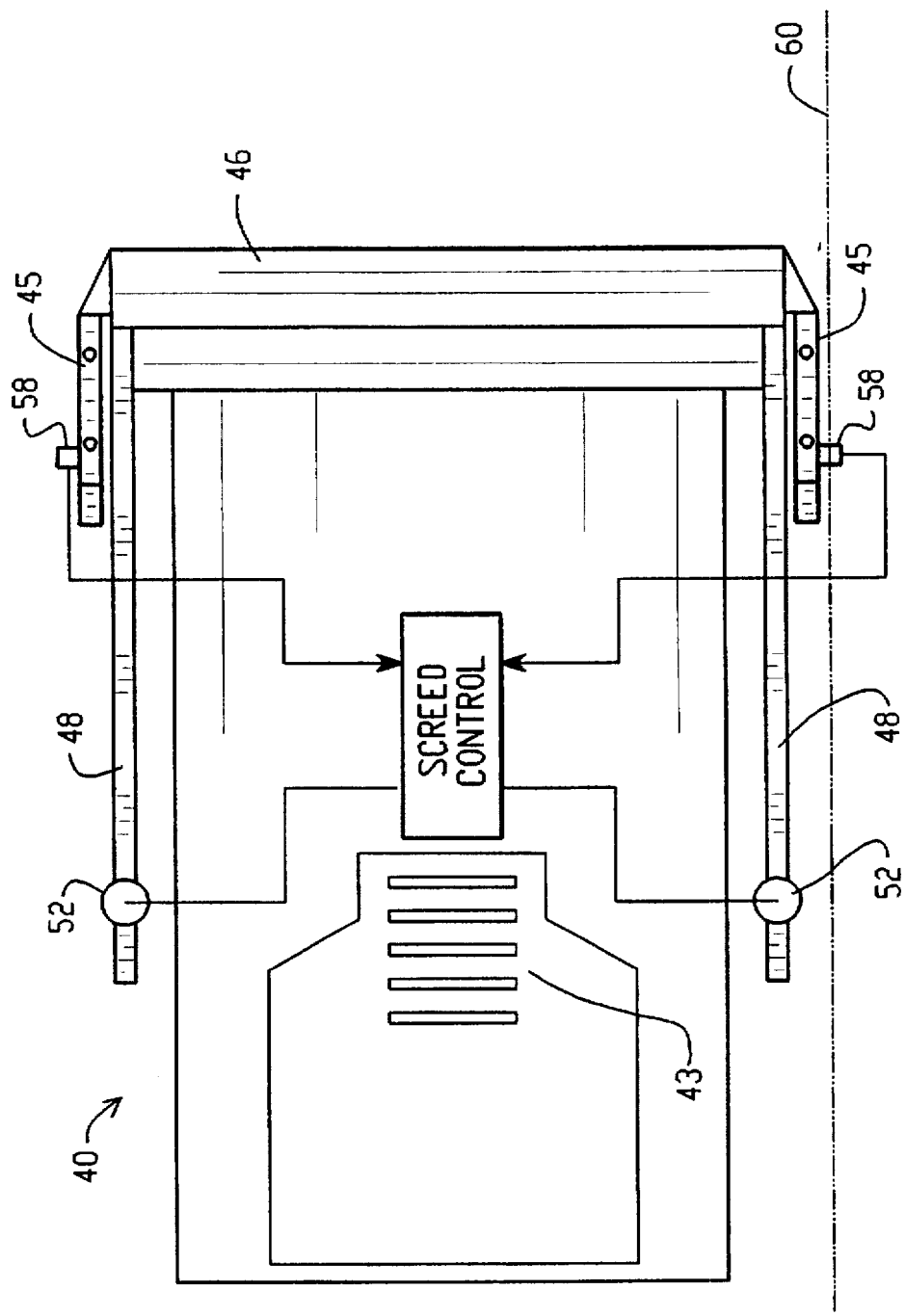
FIG. 2 shows a schematic, top view of the paver.

Referring to FIGS. 1 and 2, a road working apparatus, such as a paver 40, grader, or grinder, is a self-propelled or towed vehicle. The paver 40 includes a hopper 42 adapted for receiving paving material, such as asphalt, therein. The asphalt is moved by an internal slat conveyor 43 to a laterally extending auger 44. The auger 44 distributes paving material ahead of a material leveller. In the embodiment shown, the leveller is a floating screed 46 towed behind the paver by a pair of tow arms 48. The screed includes end gates 45 that project forwardly and contain the paving material to prevent paving material from spilling past ends of the leveller. Alternatively, the leveller can be a grading blade, a grinding tool, or other road working device. The paver rides on wheels 50 or tracks driven by a prime mover (not shown) adapted to move the paver 40 over the base surface 16. The screed 46 is adapted for levelling the paving material as the paver 40 travels forwardly. The tow arms 48 can be raised or lowered by an actuator 52, such as a hydraulic drive, acting on a tow point 51 of the tow arms to adjust the angle of attack of the screed 46, thereby changing the elevation of the screed and controlling the thickness or height of the fresh mat 53 of paving material. A leveller controller or screed controller 56 is connected to operate the actuator 52 to adjust the elevation of the screed 46, as discussed below.

The elevation of the screed relative to a reference is measured with a screed elevation measurer or grade sensor 58 mounted on the end gate 45, other part of the screed 46 or a rear part of the tow arm 48 near the screed. The grade sensor 58 moves with the screed and senses the distance to a reference. The grade sensor 58 is connected to provide a signal to the screed control 56 indicating the elevation of the screed relative to the reference.

The sensor 58 is a radar device adapted for sending and receiving radio frequency signals that are reflected by the reference and received by the sensor. Preferably, the radar device is a micropower impulse radar ("MIR") configured as a microradar rangefinder. Such MIR rangefinder are available from Amerigon, Monrovia, Calif. under license from Lawrence Livermore National Laboratory, Livermore, Calif. Preferably, the radar device has a range of about 0 to 2 meters (the distance to the reference) and a sensitivity corresponding with the size and material of the reference. The MIR device transmits 100 ps radar pulses at about 3 GHz with a duty cycle of less than 0.001 using about a 4 cm antenna. Power consumption is less than 20 mA from a 5 V source. Horns, reflectors, or lenses can be used to direct the radar beam and control beam width. The radar devices currently or imminently available are adequate for innumerable mounting configurations and references that can be used according to the present invention.

One of the references that can be used in the configuration of FIG. 1 is the base surface 16 immediately ahead of the screed and paving material. Generally, this will be a prepared surface that will provide a reasonably consistent reference. Alternatively, an adjacent surface, possibly previously paved, can be used as the reference. A temporarily constructed reference can also be used. For example, a stringline 60 is shown, which has been erected prior to paving. A moving beam towed by the paver and supported on the base surface and/or fresh mat or a form wall for concrete can also be used as the reference. Other references adjacent the paving operation are also suitable. The sensors 58 are connected to an alarm and indication panel 62 to provide information to an operator.

Figure 3:
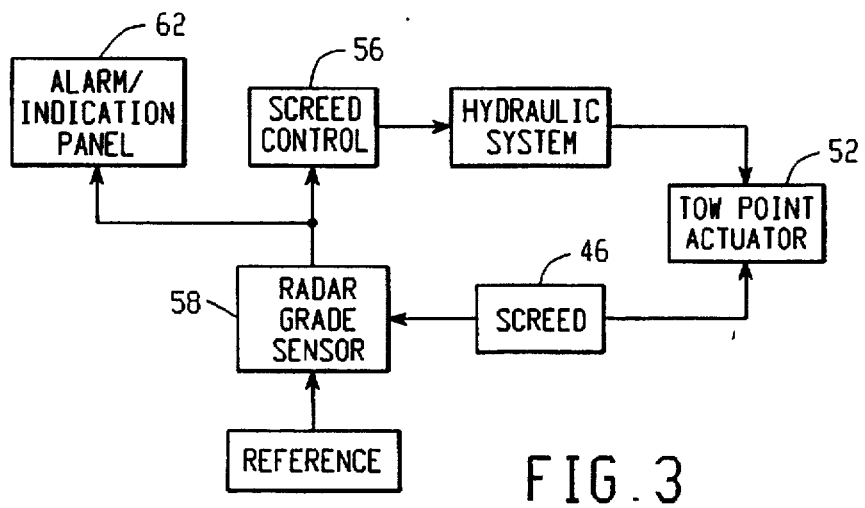
FIG. 3 shows a block diagram of a grade control system according to the invention.

In operation, with reference also to FIG. 3, a height reference, such as the string line 60 or base surface discussed previously, is established. The paver is positioned so that the grade sensor 58 senses the reference and determines a baseline or initial distance from the reference. The paver moves forwardly depositing and levelling paving material. The sensor sends a signal to the screed control 56 indicating variation in the distance to the reference. The screed control operates the paver hydraulic system to move the tow point actuator, thereby adjusting the screed elevation to return the sensor to the baseline distance or some other desired elevation. This is a continuous feedback operation and the components are adjusted to provide suitable response without undesired lag or overshoot. Slope control is accomplished by using sensors 58 on opposite ends of the screed 46 to independently control the actuators 52. Thus, elevation of the opposite ends of the screed can be independently varied to change the lateral slope of the screed.

The grade control system described herein can be adapted for use with a fresh mat profiling feedback system, such as shown in U.S. Pat. No. 5,362,177 or the Global Positioning System based profiler described in U.S. Pat. No. 5,549,412, assigned to the assignee hereof.

Figure 4:
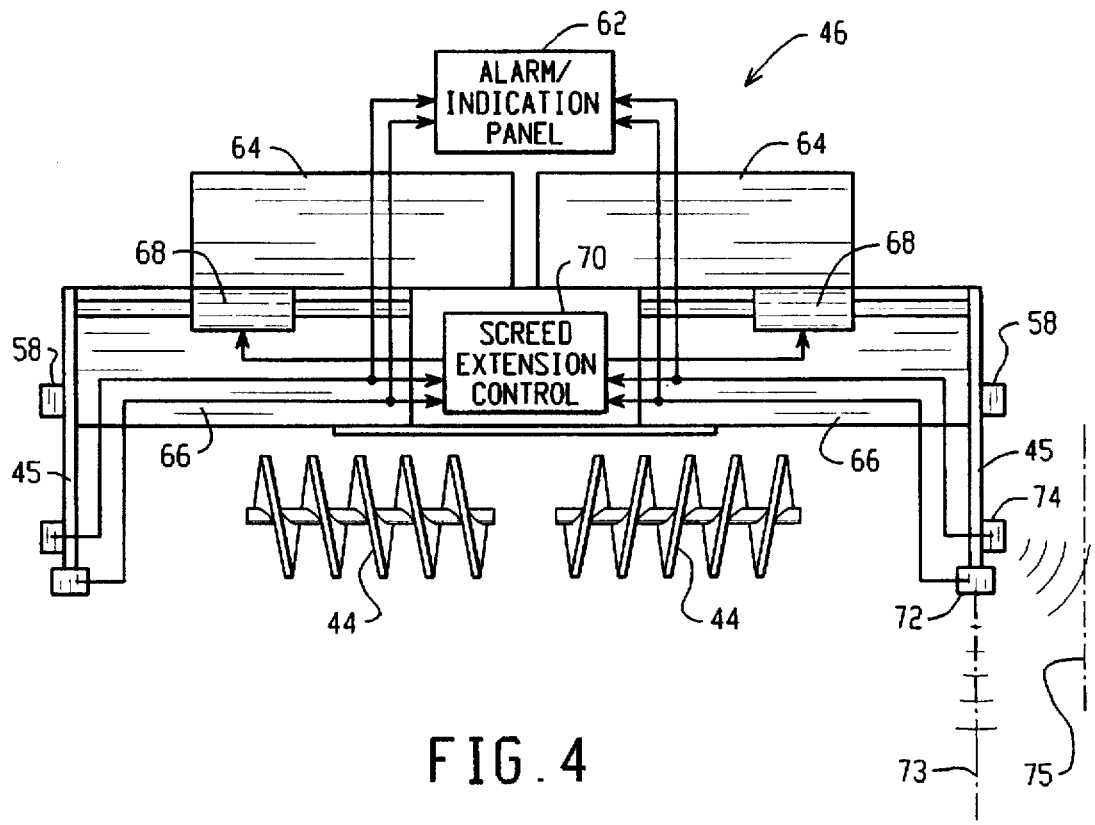
FIG. 4 shows a schematic, top view of an extendable screed of the paver.

Referring to FIG. 4, the screed 46 can be an extendable screed, of the type described in U.S. Pat. No. 4,379,653 to Brown (incorporated herein by reference), for example. The screed includes main sections 64 and extendable sections 66. The extendable sections are mounted to slide laterally thereby widening the screed 46. The extendable sections 66 are moved laterally by screed extension actuators 68, such as hydraulic devices, controlled by a screed extension controller 70.

A screed alignment sensor 72 is disposed at an end of each extendable section 66, preferably on the end gate 45. The alignment sensor 72 is an MIR device transmitting a narrow beam that is directed downwardly and forwardly. The sensor 72 tracks a reference 73 corresponding with an edge of the surface to be paved, such as a joint in the base surface or an edge of a previously layed mat of paving material. Alternatively, the sensor can be directed upwardly at the string line or some other reference. The alignment sensor 72 is connected to the screed extension control 70, which operates the actuators 68 to adjust the screed by moving the extendable sections 66 to follow the reference 73.

Lateral obstruction sensors 74 are disposed on an outboard parts of the paver, such as the end gates 45. The obstruction sensor 74 is an MIR device transmitting a relatively broad beam outwardly. The sensor 74 detects obstructions 75, such guard rails, curbs, and buildings. The sensor 74 can be connected to the screed extension control 70 to adjust the screed to avoid obstructions or maintain a selected distance from an obstruction. Alternatively or additionally, the alignment and obstruction sensors 72, 74 can be connected to the alarm panel 62 or other controller.

Figure 5:
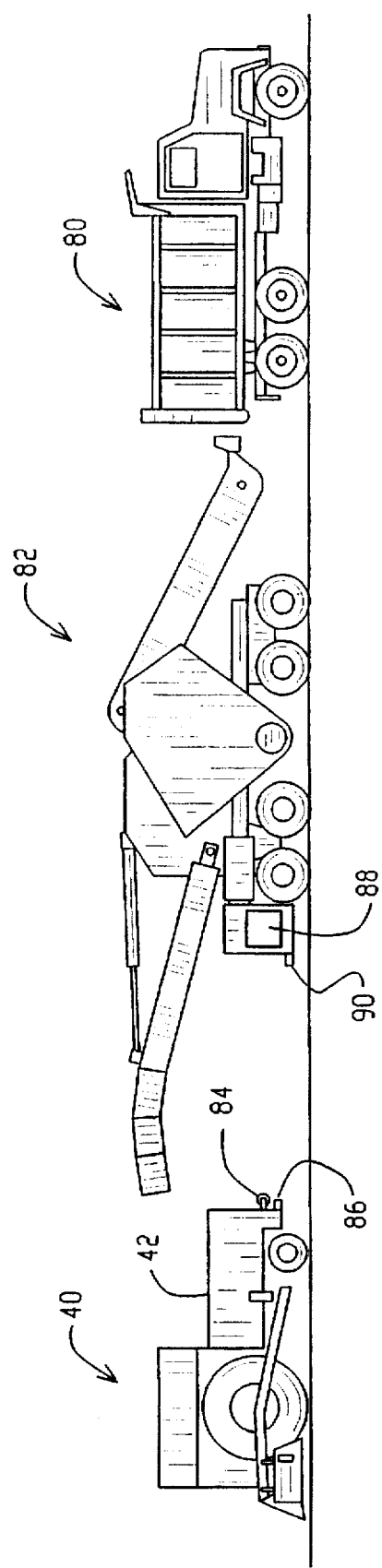
FIG. 5 shows a side elevation view of the paver, a material transfer machine, and a dump truck.

Referring to FIG. 5, a dump truck 80 delivers paving material to the paver 40 directly or through a material transfer machine 82. The dump truck 80 travels ahead of the paver 40 and dumps paving material into the hopper 42. Rollers 84 provided on the front of the paver contact rear wheels of the truck and push the truck ahead of the paver. Alternatively, the dump truck can be spaced ahead of the paver. A forward MIR sensor 86 on the front of the paver 40 senses the distance to the dump truck 80 and provides an alarm or indication at the alarm and indication panel 62 so that the truck does not cause an undesirable impact with the paver, which would create an imperfection in the mat being layed. The indication can also be used to maintain the truck a specified distance ahead of the paver. The forward sensor 86 can also be used to sense obstructions and openings in the base surface ahead of the paver.

The material transfer machine 82 is used between the dump truck 80 and paver 40 to move the paving material from the truck to the paver, possibly processing the material during transfer. The forward sensor 86 senses the distance to the transfer machine 82 and the sensor signal can be used to maintain the transfer machine a specified distance ahead of the paver. Transfer machine speed and position can be controlled manually, in response to sensor information, or automatically by connecting the sensor to a speed control 88 of the transfer machine 82. Preferably, the forward sensor is connected to the speed control 88 by transmitting a radar signal to a transfer machine MIR sensor 90 that acts as a receiver. Other information can also be transmitted between the paver and the transfer machine. The transfer machine sensor 90 can also be used to sense distance to the paver and control the transfer machine speed accordingly.

The present disclosure describes several embodiments of the invention, however, the invention is not limited to these embodiments. Other variations are contemplated to be within the spirit and scope of the invention and appended claims.

What is claimed is:

1. A road working apparatus comprising:

a movable vehicle;

a leveller disposed on the vehicle for forming a mat of material on a base surface;

a radar device for determining the position of the leveller relative to a reference; and a leveller controller for adjusting the leveller responsive to leveller position information from the radar device.

2. A road working apparatus according to claim 1, wherein the radar device is a micropower impulse radar.

3. A road working apparatus according to claim 1, wherein the radar device is a rangefinder.

4. A road working apparatus according to claim 1, wherein the reference is a string line.

5. A road working apparatus according to claim 1, wherein the reference is a base surface being worked.

6. A road working apparatus according to claim 1, wherein the vehicle is a paver adapted for levelling paving material.

7. A road working apparatus according to claim 6, wherein the leveller comprises a floating screed.

8. A road working apparatus according to claim 7, wherein the leveller is laterally extendable and the leveller controller is adapted for controlling extension of the screed.

9. A road working apparatus according to claim 8, further comprising an extension actuator adapted for laterally extending the screed, wherein the controller is connected to operate the actuator.

10. A road working apparatus according to claim 7, wherein the controller is adapted for adjusting screed elevation responsive to the leveller position information from the radar device.

11. A road working apparatus according to claim 7, further comprising an actuator adapted for adjusting screed elevation, wherein the leveller controller is connected to operate the actuator.

12. A road working apparatus according to claim 11, further comprising a tow arm connected to tow the screed and adapted for being operated by the actuator for adjusting the screed.

13. A road working apparatus according to claim 12, wherein the controller, radar device, tow arm, and actuator are adapted for adjusting elevation of an end of the screed and further comprising a second radar device, a second tow arm, and a second actuator, adapted for controlling elevation of another end of the screed with respect to a second reference so as to provide slope control.

14. A road working apparatus according to claim 7, wherein the radar device is disposed on the screed.

15. A road working apparatus according to claim 1, wherein the leveller is laterally extendable and the controller is adapted for controlling extension of the leveller responsive to the leveller position information.

16. A road working apparatus according to claim 1, wherein the controller is adapted for controlling elevation of the leveller responsive to the leveller position information.

17. A paver comprising:

a hopper for receiving and holding paving material;

a screed for levelling paving material from the hopper on a base surface;

a conveyor for moving the paving material from the hopper to the screed;

an auger for distributing paving material from the conveyor laterally ahead of the screed;

a pair of tow arms extending forwardly from the screed;

an actuator connected to adjust one of the tow arms thereby adjusting the screed;

a grade sensor mounted for movement with the screed and comprising a radar device adapted for measuring a distance to a reference; and a screed control connected to control the actuator responsive to distance signals from the grade sensor so as to adjust screed elevation.

18. A paver according to claim 17, wherein the grade sensor is mounted on the screed.

19. A paver according to claim 17, wherein the screed includes an end gate disposed at an end thereof for containing paving material and the grade sensor is mounted on the end gate.

20. A paver according to claim 17, wherein the radar device is adapted for sensing the distance to the base surface.

21. A paver according to claim 17, wherein the radar device is adapted for sensing the distance to a string line.

22. A paver according to claim 17, wherein the radar device is adapted for sensing the distance to a temporarily constructed reference.

23. A road working apparatus according to claim 17, further comprising a second radar device disposed on an end of the screed and adapted for sensing deviation from a second reference wherein the screed is laterally extendable and the screed control is adapted for controlling extension of the screed responsive to sensed deviation from the second reference.

24. A road working apparatus according to claim 23, wherein the second radar device is mounted so that deviation sensing comprises laterally sensing a distance to the second reference.

25. A road working apparatus according to claim 17, further comprising a second radar device disposed on an end of the screed and adapted for sensing distance to an obstruction wherein the screed is laterally extendable and the screed control is adapted for controlling extension of the leveller responsive to a sensed distance from the obstruction.

26. A paver comprising:

a hopper for receiving and holding paving material;

a screed for levelling paving material from the hopper on a base surface, said screed having an extendable section;

an actuator adapted for laterally extending and retracting the extendable section of the screed;

a conveyor for moving the paving material from the hopper to the screed;

an auger for distributing paving material from the conveyor laterally ahead of the screed;

a screed alignment sensor disposed on the extendable section of the screed and comprising a radar device adapted for measuring deviation from a reference; and a screed control connected to control the actuator responsive to signals from the alignment sensor so as to adjust screed extension.

* * * * *

UNITED STATES PATENT AND TRADEMARK OFFICE
CERTIFICATE OF CORRECTION

PATENT NO. : 5,752,783
DATED : May 19, 1998
INVENTOR(S) : Kerry Malone

It is certified that error appears in the above-identified patent and that said Letters Patent is hereby corrected as shown below:

Col. 6, Claim 25, Line 55, delete "leveller" and insert therefor --screed--.

Signed and Sealed this

Fifteenth Day of September, 1998

Attest:

BRUCE LEHMAN

Attesting Officer

Commissioner of Patents and Trademarks